(No Model.)
H. C. FISH.
COFFEE POT.
No. 259,121. Patented June 6, 1882.
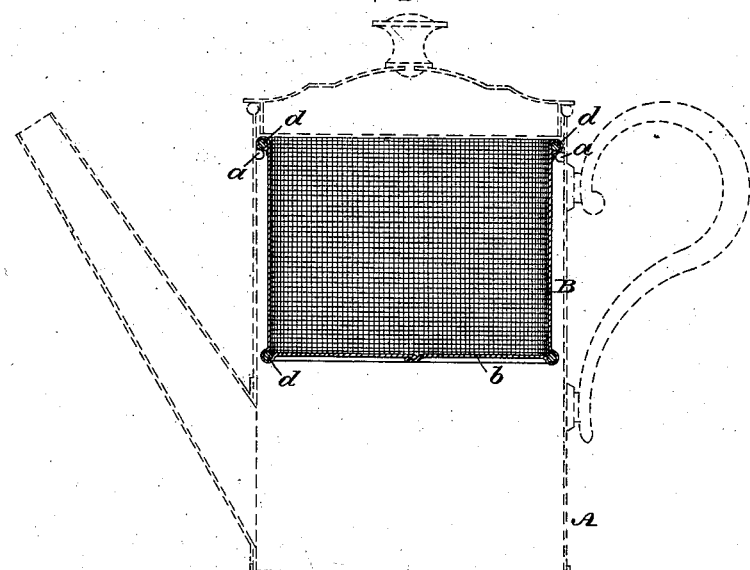
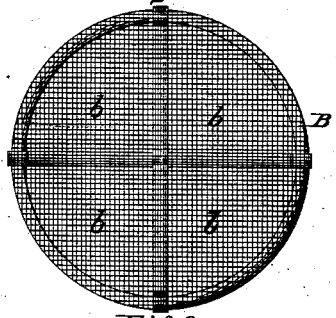
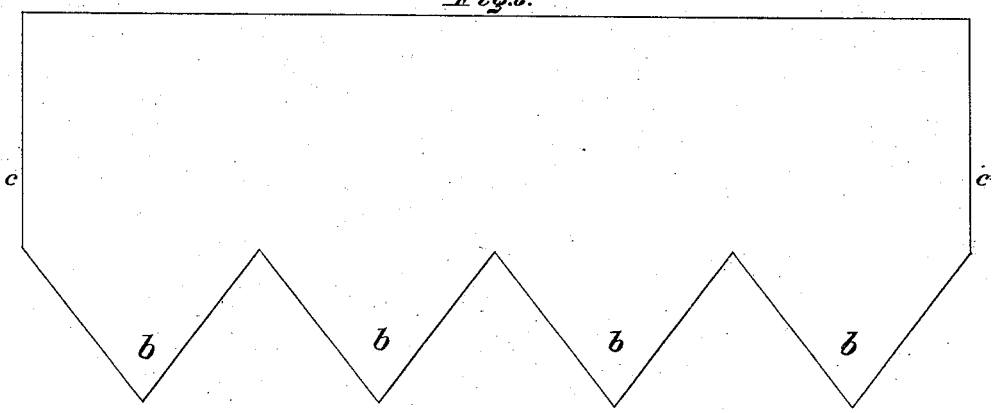
WITNESSES:
A. P. Grantz
W. F. Kircher
INVENTOR:
H. Clay Fish,
BY John A. Wiedersheim
ATTORNEY.
N. PETERS. Photo-Lithographer, Washington, D. C.

UNITED STATES PATENT OFFICE.

H. CLAY FISH, OF PHILADELPHIA, PENNSYLVANIA.

COFFEE-POT.

SPECIFICATION forming part of Letters Patent No. 259,121, dated June 6, 1882.

Application filed January 12, 1882. (No model.)

*To all whom it may concern:*

Be it known that I, H. CLAY FISH, a citizen of the United States, residing in the city and county of Philadelphia, State of Pennsylvania, have invented a new and useful Improvement in Coffee-Pots, which improvement is fully set forth in the following specification and accompanying drawings, in which—

Figure 1 is a view of a coffee-pot dotted, showing the sack embodying my invention in vertical section. Fig. 2 is a bottom view of the sack. Fig. 3 is a view showing the shape of the piece of fabric from which the sack is made.

Similar letters of reference indicate corresponding parts in the several figures.

My invention consists of a bag or sack or percolator for holding ground coffee, adapted to be suspended within a coffee-pot, and constructed of a piece of textile material, forming the body and a bottom which is integral therewith, which is flat and enforced, whereby the boiling water or steam is reliably passed through the mass of ground coffee, the coffee is prevented from packing or matting, and the bottom of the sack is sustained and rendered more durable, the invention being equally applicable to tea-pots and other utensils of the kind, said sack being also held distended at the bottom, so that the flat shape of the bottom is preserved, especially when the sack is supplied with the ground coffee. The bottom distending-ring is sewed to the sack after being located in position, so as to prevent shifting of said ring when the sack is in use or overturned for cleaning purposes.

Referring to the drawings, A represents a coffee-pot, shown dotted, and formed on its inner face, near the top, with a ledge, shoulder, ring, or other support, as at $a$, for the sack B, in which the ground coffee is placed, the support $a$ of the pot and the sack, broadly considered, not being novel features. The sack is formed of muslin or any other suitable textile fabric, as follows: Taking a quadrilateral piece of fabric, the edge thereof which corresponds with the bottom of the sack has angular or V-shaped pieces cut out therefrom at intervals, and the corners are also cut off angularly, thus forming points or tabs $b$, of which four are employed in the present case. The end edges, $c$, of the piece are then sewed together, forming the body of the sack, and the edges of the tabs are hemmed, and the edges of the adjacent or contiguous tabs are sewed one to the other, thus forming the closed bottom of the sack, the shape of the body of the sack being that of a cylinder. To the top and bottom edges of the sack I secure, by stitching or otherwise, rings $d$ $d$, thus stiffening said edges, the upper ring being adapted to rest on the support $a$, whereby the sack is sustained in position, both rings preserving the shape of the sack.

It will be seen that the bottom of the sack is flat, whereby when the ground coffee is placed thereon it may be spread out over said bottom, so that the coffee will not mat or pack and the scalding or hot water or steam directed on the coffee will pass through the same without escaping above the level of the mass, which advantageous features are not occasioned where the sacks are of conical form. Furthermore, the bottom of the sack is stretched tight, and is also re-enforced by the union of the edges of the tabs, said edges being hemmed and adjacent edges overlapping or overseamed, so that, as the bottom is of increased strength, it will not sag to any material extent, and its reliability and great durability are assured. The sack has also the advantage that its body and bottom are made of one piece of fabric.

I am aware that it is not new to form a percolator of cylindrical shape the bottom whereof is flat; but the same is constructed of perforated metal; and I am also aware that it is not new to form a percolator of knitted fabric the bottom of which is distended by a ring; wherefore I disclaim such features.

I am also aware that it is not new to form a sack or bag of a piece of fabric the bottom of which is integral with the body and consists of pieces united one to the other, such features being also disclaimed.

Having thus described my invention, what I claim as new, and desire to secure by Letters Patent, is—

The coffee-pot sack consisting of a body and a bottom formed of one piece of fabric, said piece being cut to form points, which are united one to another at the bottom, the contiguous edges overlapping, and rings at top and bottom of the sack, both rings being sewed to the fabric, substantially as and for the purpose set forth.

H. CLAY FISH.

Witnesses:
JOHN A. WIEDERSHEIM,
A. P. GRANT.